United States Patent
Lee et al.

(10) Patent No.: US 8,349,492 B2
(45) Date of Patent: Jan. 8, 2013

(54) NEGATIVE ELECTRODE FOR RECHARGEABLE LITHIUM BATTERY, AND RECHARGEABLE LITHIUM BATTERY INCLUDING SAME

(75) Inventors: Sang-Min Lee, Yongin-si (KR); Goo-Jin Jeong, Yongin-si (KR); Min-Seok Sung, Yongin-si (KR); Yong-Mook Kang, Yongin-si (KR); Wan-Uk Choi, Yongin-si (KR); Sung-Soo Kim, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 175 days.

(21) Appl. No.: 12/017,451

(22) Filed: Jan. 22, 2008

(65) Prior Publication Data

US 2008/0268338 A1  Oct. 30, 2008

(30) Foreign Application Priority Data

Apr. 24, 2007  (KR) .................. 10-2007-0039890

(51) Int. Cl.
*H01M 4/13* (2010.01)
(52) U.S. Cl. .............. 429/218.1; 429/231.95; 429/219; 429/222; 429/225; 429/229; 429/231.5; 429/231.6
(58) Field of Classification Search .................. None
See application file for complete search history.

(56) References Cited

U.S. PATENT DOCUMENTS

| 7,326,497 B2 | 2/2008 | Matsubara et al. | |
|---|---|---|---|
| 2003/0215717 A1* | 11/2003 | Miyaki | 429/232 |
| 2004/0072076 A1* | 4/2004 | Matsubara et al. | 429/231.8 |
| 2005/0221185 A1* | 10/2005 | Sakata et al. | 429/231.8 |
| 2007/0231690 A1* | 10/2007 | Fujita et al. | 429/209 |

FOREIGN PATENT DOCUMENTS

| CN | 1937289 | 3/2007 |
|---|---|---|
| JP | 2006-222073 | 8/2006 |
| KR | 2001-68269 | 7/2001 |
| KR | 10-326447 | 2/2002 |
| KR | 10-359605 | 10/2002 |
| KR | 10-445438 | 8/2004 |
| WO | WO 2005/096414 | 11/2005 |

OTHER PUBLICATIONS

Xia et al, Flake Cu-Sn Alloys as Negative Electrode Materials for Rechargeable Lithium Batteries, Journal of The Electrochemical Society 148 (5) A471-A481 (2001).*
English translation of Office Action issued in corresponding Chinese Patent Application No. 200810001072.2 dated May 22, 2009.
English Abstract for Korean Publication No. 2001-37101.

* cited by examiner

*Primary Examiner* — Emily Le
*Assistant Examiner* — Sarah A Slifka
(74) *Attorney, Agent, or Firm* — Knobbe Martens Olson & Bear LLP

(57) ABSTRACT

The negative electrode for a rechargeable lithium battery includes a current collector and a negative active material layer disposed on the current collector. The negative active material layer includes a metal-based negative active material and sheet-shaped graphite and has porosity of 20 to 80 volume %. The negative electrode for a rechargeable lithium battery can improve cell characteristics by inhibiting volume change and stress due to active material particle bombardment during charge and discharge, and by decreasing electrode resistance.

18 Claims, 5 Drawing Sheets

NEGATIVE ELECTRODE FOR RECHARGEABLE LITHIUM BATTERY, AND RECHARGEABLE LITHIUM BATTERY INCLUDING SAME

CROSS-REFERENCE TO RELATED APPLICATIONS

This application claims priority to and the benefit of Korean Patent Application No. 10-2007-39890 filed in the Korean Intellectual Property Office on Apr. 24, 2007, the entire content of which is incorporated herein by reference.

BACKGROUND OF THE INVENTION

1. Field of the Invention

Aspects of the present invention relate to a negative electrode for a rechargeable lithium battery and a rechargeable lithium battery including the same. More particularly, aspects of the present invention relate to a negative electrode for a rechargeable lithium battery that improves cell characteristics by inhibiting volume change and stress due to active material particle bombardments during charge and discharge, and a rechargeable lithium battery including the same.

2. Description of the Related Art

Lithium rechargeable batteries have become popular as power sources of small portable electronic devices. A lithium rechargeable battery uses an organic electrolyte solution and thereby has a discharge voltage that is twice as high as a conventional battery using an alkali aqueous solution. Accordingly, the lithium rechargeable battery has a high energy density.

For a positive active material of a rechargeable lithium battery, lithium-transition element composite oxides being capable of intercalating lithium, such as $LiCoO_2$, $LiMn_2O_4$, $LiNiO_2$, $LiNi_{1-x}Co_xO_2$ (0<x<1), $LiMnO_2$, and so on, have been used.

For a negative active material of a rechargeable lithium battery, various carbon-based materials such as artificial graphite, natural graphite, and hard carbon, which can intercalate and deintercalate lithium ions, have been used. Graphite increases discharge voltages and energy density of a battery because graphite has a low discharge potential of −0.2V compared to lithium. A battery using graphite as a negative active material has a high average discharge potential of 3.6V and an excellent energy density. Furthermore, graphite is most commonly used among the aforementioned carbon-based materials since graphite guarantees a better cycle life for a battery due to its outstanding reversibility. However, a graphite active material typically has a low density and consequently a low capacity in terms of energy density per unit volume when used as a negative active material. Further, the use of graphite involves some dangers such as explosion or combustion when a battery is misused or overcharged and the like, because graphite is likely to react with an organic electrolyte at a high discharge voltage.

In order to solve these problems, much research on oxide negative electrodes including tin oxide, or lithium vanadium oxide, has recently been carried out. However, such an oxide negative electrode does not show sufficient battery performance and therefore there has been a great deal of further research into oxide negative materials.

SUMMARY OF THE INVENTION

Aspects of the present invention provide a negative electrode for a rechargeable lithium battery that improves cell characteristics by inhibiting volume change and stress due to active material particle bombardments during charge and discharge and by decreasing electrode resistance.

According to one embodiment of the present invention, provided is a negative electrode for a rechargeable lithium battery that includes a current collector, and a negative active material layer disposed on the current collector. The negative active material layer includes a metal-based negative active material and sheet-shaped graphite and has porosity of 20 to 80 volume %.

According to aspects of the present invention, pores of the negative active material layer having a pore diameter of 1 μm or less constitute 30 to 70 volume % based on the total volume of the negative active material layer. The sheet-shaped graphite may be present in an amount of 5 to 80 wt % based on the total weight of the negative active material layer. The (002) planes of the sheet-shaped graphite may be oriented in the same direction. The (002) planes of the sheet-shaped graphite may be oriented in a vertical direction with respect to the current collector. The sheet-shaped graphite may be at least one selected from the group consisting of natural graphite, artificial graphite, pyrolyzed graphite, and mixtures thereof. The sheet-shaped graphite may have an average particle diameter ($D_{50}$) ranging from 1 to 20 μm. The metal-based negative active material may be at least one selected from the group consisting of lithium, a metal material that alloys with lithium, a material that is reversibly doped and dedoped with lithium, a material that reversibly forms a lithium-containing compound, a transition element oxide, and mixtures thereof. The metal-based negative active material can be at least one selected from the group consisting of Na, K, Rb, Cs, Fr, Be, Mg, Ca, Sr, Ba, Ra, Ti, Ag, Zn, Cd, Al, Ga, In, Si, Ge, Sn, Pb, Sb, Bi, and combinations thereof. The negative active material can be vanadium oxide; lithium vanadium oxide; Si; $SiO_x$ (0<x<2); Sn; $SnO_2$; an alloy of a transition element and an element selected from the group consisting of Si, Sn, Al, and combinations thereof; or mixtures thereof.

According to another embodiment of the present invention, a rechargeable lithium battery including the negative electrode described above is provided. The rechargeable lithium battery includes the above negative electrode, a positive electrode including a positive active material being capable of reversibly intercalating and deintercalating lithium ions, and an electrolyte including a non-aqueous organic solvent and a lithium salt.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
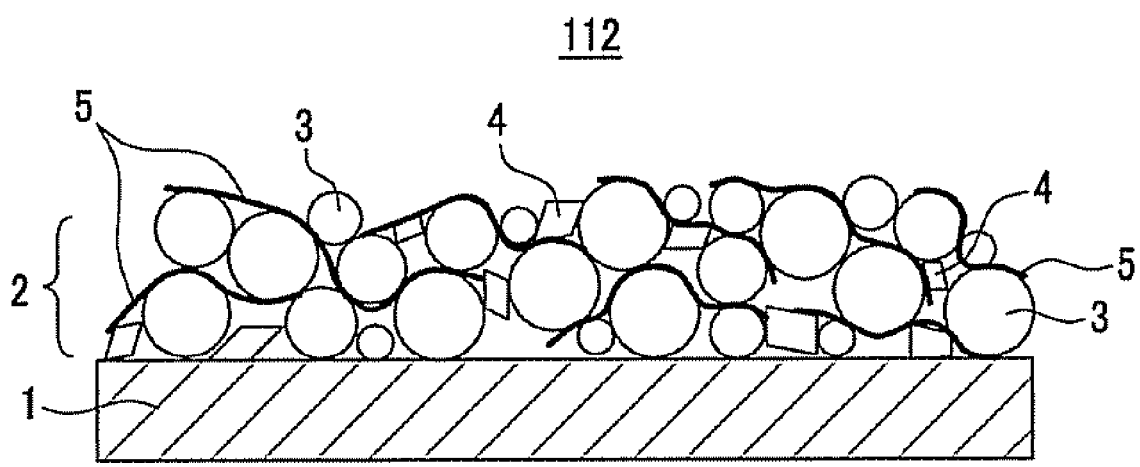
FIG. 1 schematically shows a negative electrode of a rechargeable lithium battery according to one embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

When a rechargeable lithium battery includes a negative active material that includes a metallic negative active material, the volume of the negative active material expands remarkably during charging of the lithium battery. In order to absorb the volume expansion into the electrode plate during battery charging, it is desirable to utilize pores present in the electrode plate.

According to one embodiment of the present invention, a negative active material layer in a rechargeable lithium battery includes a sheet-shaped graphite powder and a metallic negative active material to optimize the porosity of the negative active material layer. Maximizing the porosity of the negative active material layer prevents stress from accumulating due to adjacent particle bombardment during the active material particle expansion and decreases the total electrode expansion rate. This improves the battery conductivity of the electrode and improves the cell characteristics of the rechargeable lithium battery.

FIG. 1 schematically shows a negative electrode of a rechargeable lithium battery according to one embodiment of the present invention. Referring to FIG. 1, the negative electrode for a rechargeable lithium battery 112 includes a current collector 1 and a negative active material layer 2 disposed on the current collector.

The current collector 1 may be selected from the group consisting of a copper foil, a nickel foil, a stainless steel foil, a titanium foil, a nickel foam, a copper foam, and a polymer substrate coated with a conductive metal. At least one material described above may be laminated to form a current collector 1.

The negative active material layer 2 includes a metal-based negative active material 3 and sheet-shaped graphite 4, and has porosity of 20 to 80 volume %.

The metallic negative active material may be at least one selected from the group consisting of lithium, a metal material that can alloy with lithium, a material that may be reversibly doped and dedoped with lithium, a material that may reversibly form a lithium-containing compound, and a transition element oxide. The metal that can alloy with lithium may be at least one metal selected from the group consisting of Na, K, Rb, Cs, Fr, Be, Mg, Ca, Sr, Ba, Ra, Ti, Ag, Zn, Cd, Al, Ga, In, Si, Ge, Sn, Pb, Sb, Bi, and combinations thereof. Examples of the transition element oxide, the material that may be reversibly doped and dedoped with lithium, and the material may reversibly form forming a lithium-containing compound include vanadium oxide, lithium vanadium oxide, Si, $SiO_x$ (0<x<2), Sn, $SnO_2$, and an alloy of a transition element and an element selected from the group consisting of Si, Sn, and Al, and combinations thereof.

The metallic negative active material particles 3 are included in an amount of 10 to 99 wt % based on the total weight of the negative active material layer 2. As a more specific, non-limiting example, the negative active material particles 3 can be included in an amount of 50 to 98 wt % based on the total weight of the negative active material layer 2. When the metallic negative active material is included in an amount out of the range, the capacity of the negative active material may be worsened, or the relative amount of binder may be reduced and thereby the adherence between the negative active material layer and a current collector may be worsened.

The sheet-shaped graphite 4 functions as a conductive agent as well as a lubricant between the metallic active material particles. In this text, the term "sheet-shaped" refers to a thin and flat shape. The sheet-shaped graphite 4 may be natural graphite, artificial graphite, pyrolyzed graphite, and so on.

The sheet-shaped graphite has an average particle diameter ($D_{50}$) ranging from 1 to 20 μm. As a specific, non-limiting example, the sheet-shaped graphite may have an average particle diameter ($D_{50}$) ranging from 1 to 10 μm. When the sheet-shaped graphite has an average particle diameter of less than 1 μm, the energy density of the electrode may be decreased, while when average particle diameter is more than 20 μm, appropriate pore distribution cannot be obtained.

According to one aspect of the present invention, the negative active material layer includes 5 to 80 wt % of the sheet-shaped graphite 4 based on the total weight of the negative active material layer. As a specific, non-limiting example, the negative active material layer may include 10 to 50 wt % of the sheet-shaped graphite 4 based on the total weight of the negative active material layer. When the sheet-shaped graphite is included at less than 5 wt %, the sheet-shaped graphite may not function as a lubricant. On the other hand, when the sheet-shaped graphite is more than 80 wt %, the electrode energy density may be worsened.

The negative active material layer 2 includes a binder 5 and further optionally includes a conductive agent (not shown).

The binder 5 improves binding properties of the metallic negative active material particles 3 to each other and to the current collector 1. Examples of the binder include at least one selected from the group consisting of polyvinylalcohol, carboxylmethyl cellulose, hydroxypropylene cellulose, diacetylene cellulose, polyvinylchloride, carboxylated polyvinylchloride, polyvinyidifluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and so on, but is not limited thereto.

The conductive agent improves the electrical conductivity of a negative electrode. Any electrically conductive material can be used as a conductive agent as long as it is not a material that causes a chemical change. Examples of the conductive agent include natural graphite, artificial graphite, carbon black, acetylene black, ketjen black, carbon fiber, metal powder or a metal fiber including copper, nickel, aluminum, silver, and so on, or a polyphenylene derivative.

The above-mentioned negative electrode 112 is provided by mixing the metal-based negative active material 3, sheet-shaped graphite 4, binder 5, and the optional conductive agent in a solvent to providing a composition for a negative active material layer, and coating the composition on the current collector 1. The method of manufacturing an electrode is well known in this art, so a detailed description thereof will be omitted. The solvent may include N-methylpyrrolidone, but it is not limited thereto.

According to an embodiment of the present invention, a negative electrode for a rechargeable lithium battery may be prepared by coating the composition for a negative active material layer onto a current collector, applying a magnetic field thereto to orient the graphite in the magnetic field in the same direction, and removing the solvent, and solidifying the same using a binder. According to one aspect, the strength of the magnetic field is 0.5 T or more, and the duration of applying the magnetic field ranges from 0.1 second to 10 minutes depending upon the viscosity of the composition for a negative active material layer. The composition for the negative active material layer is heated to remove the solvent by evaporation. The obtained negative electrode includes the sheet-shaped graphite particles having the (002) plane oriented in the same direction in the negative active material layer. If the (002) plane of the graphite particle is oriented in the same direction and the positive electrode is located in the direction the (002) plane of the graphite particles, that is, in the edge direction of the graphite particles, lithium ions between the negative electrode and the positive electrode are smoothly transferred from the edge of the graphite layers to a location between graphite layers during charge. According to another embodiment, the (002) plane of the sheet-shaped graphite particle is oriented in the vertical direction with respect to the current collector.

According to an aspect of the present invention, the negative active material layer has porosity ranging from 20 to 80 volume %. As a specific, non-limiting example, the porosity may range from 30 to 60 volume %. When the porosity of the negative active material layer is less than 20 volume %, it may not fully buffer the volume change of the metal-based negative active material. On the other hand, when the porosity is more than 80 volume %, the mechanical strength of negative active material layer is decreased and the electrode energy density is decreased.

According to one aspect of the present invention, the porosity distribution depending upon the pore diameter in the negative active material layer can be changed by including sheet-shaped shaped graphite in the negative active material layer. A conventional negative active material layer not including sheet-shaped graphite may have pores having a pore diameter of 1 μm or less in an amount of 25 volume % based on the total pore volume. However, according to one aspect of the present invention, the negative active material layer including sheet-shaped graphite has pores having a pore diameter of 1 μm or less in an amount of 30 to 70 volume % based on the total pore volume. As a specific, non-limiting example, the pores having a pore diameter of 1 μm or less may range from 40 to 70 volume %. Volume expansion is effectively controlled during charging Li ions by providing pores having the pore diameters with in the specified ranges, and an electrolyte drying phenomena is suppressed during the charge. When the pores having a pore diameter of 1 μm or less are present at less than 30 volume %, the electrode plate expansion is not effectively suppressed. On the other hand, when the pores having a pore diameter of 1 μm or less are present at more than 70 volume %, the electrode plate may be impregnated.

According another embodiment of the present invention, provided is a rechargeable lithium battery including the negative electrode. The rechargeable lithium battery includes the negative electrode, a positive electrode including a positive active material that is capable of intercalating and deintercalating lithium ions, and an electrolyte including a non-aqueous organic solvent and a lithium salt.

Rechargeable lithium batteries may be classified as lithium ion batteries, lithium ion polymer batteries, and lithium polymer batteries according to the presence of a separator and the kind of electrolyte used in the battery. The rechargeable lithium batteries may have a variety of shapes and sizes, and include cylindrical, prismatic, or coin-type batteries, and may be a thin film battery or a bulk-type battery. Structures and fabricating methods for lithium ion batteries pertaining to the present invention are well known in the art.

Figure 2:
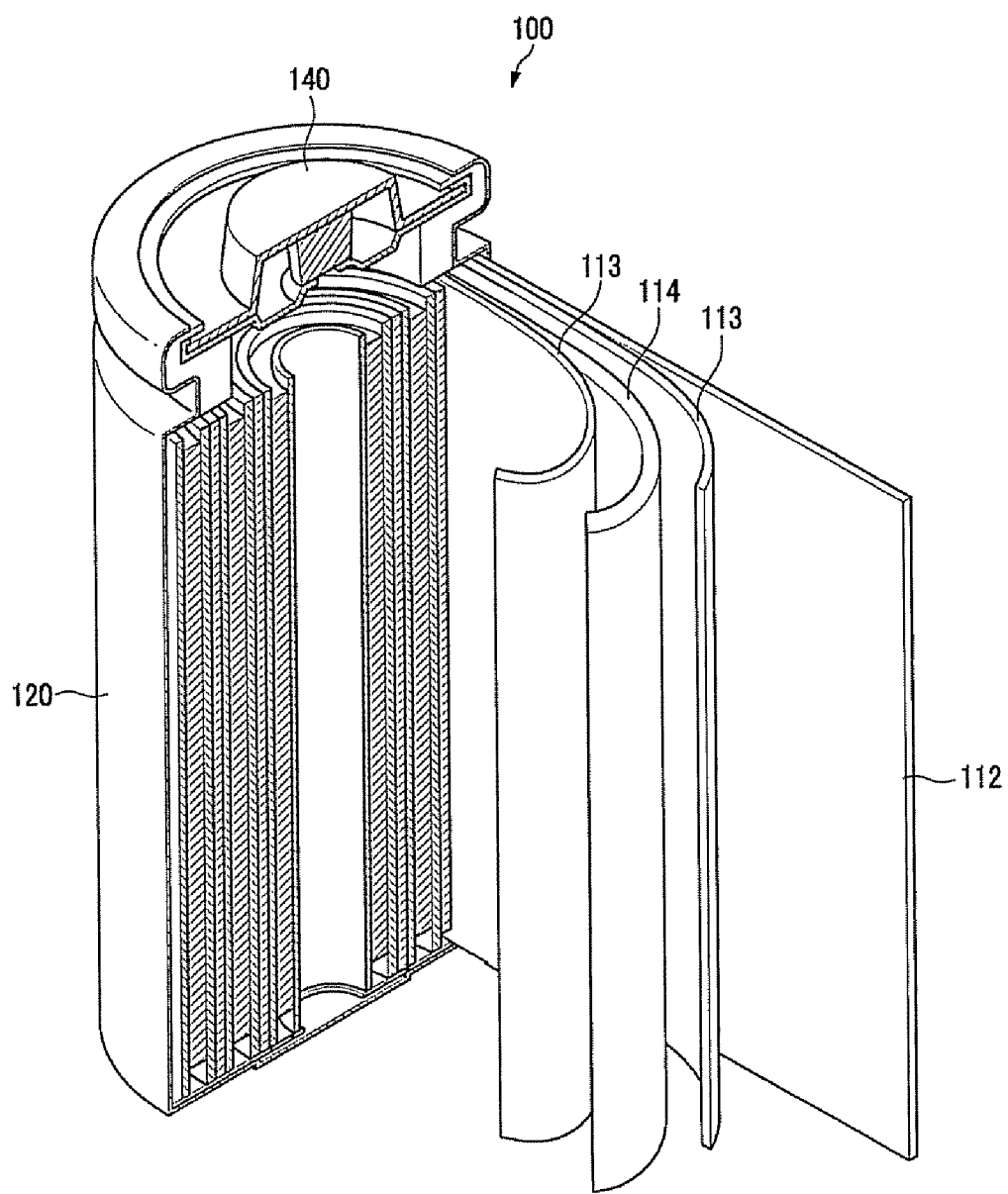
FIG. 2 is a schematic cross-sectional perspective view of a rechargeable lithium battery according to one embodiment of the present invention.

FIG. 2 shows a structure of a rechargeable lithium battery 100 according to one embodiment of the present invention. In FIG. 2, the rechargeable lithium battery 100 includes a negative electrode 112, a positive electrode 114, a separator 113 interposed between the negative electrode 112 and the positive electrode 114, an electrolyte impregnating the separator 113, a battery case 120, and a sealing member 140 sealing the battery case 120.

The negative electrode 112 is the same as described above. The positive electrode 114 includes a current collector, and a positive active material layer disposed on the current collector.

The positive active material layer may include a positive active material, such as, for example, a lithiated intercalation compound that is capable of reversibly intercalating and deintercalating lithium ions. Specifically, the positive active material may include compounds of the following Chemical Formulas 1 to 24.

$$Li_aA_{1-b}B_bD_2 \quad \text{[Chemical Formula 1]}$$

wherein, in the above formula, $0.95 \leq a \leq 1.1$ and $0 \leq b \leq 0.5$.

$$Li_aE_{1-b}B_bO_{2-c}F_c \quad \text{[Chemical Formula 2]}$$

wherein, in the above formula, $0.95 \leq a \leq 1.1$, $0 \leq b \leq 0.5$, and $0 \leq c \leq 0.05$.

$$LiE_{2-b}B_bO_{4-c}F_c \quad \text{[Chemical Formula 3]}$$

wherein, in the above formula, $0 \leq b \leq 0.5$ and $0 \leq c \leq 0.05$.

$$Li_aNi_{1-b-c}Co_bB_cD_\alpha \quad \text{[Chemical Formula 4]}$$

wherein, in the above formula, $0.95 \leq a \leq 1.1$, $0 \leq b \leq 0.5$, $0 \leq c \leq 0.05$, and $0 < \alpha < 2$.

$$Li_aNi_{1-b-c}Co_bB_cO_{2-\alpha}F_\alpha \quad \text{[Chemical Formula 5]}$$

wherein, in the above formula, $0.95 \leq a \leq 1.1$, $0 \leq b \leq 0.5$, $0 \leq c \leq 0.05$, and $0 < \alpha < 2$.

$$Li_aNi_{1-b-c}Co_bB_cO_{2-\alpha}F_2 \quad \text{[Chemical Formula 6]}$$

wherein, in the above formula, $0.95 \leq a \leq 1.1$, $0 \leq b \leq 0.5$, $0 \leq c \leq 0.05$, and $0 < \alpha < 2$.

$$Li_aNi_{1-b-c}Mn_bB_cD_\alpha \quad \text{[Chemical Formula 7]}$$

wherein, in the above formula, $0.95 \leq a \leq 1.1$, $0 \leq b \leq 0.5$, $0 \leq c \leq 0.05$, and $0 < \alpha < 2$.

$$Li_aNi_{1-b-c}Mn_bB_cO_{2-\alpha}F_\alpha \quad \text{[Chemical Formula 8]}$$

wherein, in the above formula, $0.95 \leq a \leq 1.1$, $0 \leq b \leq 0.5$, $0 \leq c \leq 0.05$, and $0 < \alpha < 2$.

$$Li_aNi_{1-b-c}Mn_bB_cO_{2-\alpha}F_2 \quad \text{[Chemical Formula 9]}$$

wherein, in the above formula, $0.95 \leq a \leq 1.1$, $0 \leq b \leq 0.5$, $0 \leq c \leq 0.05$, and $0 < \alpha < 2$.

$$Li_aNi_bE_cG_dO_2 \quad \text{[Chemical Formula 10]}$$

wherein, in the above formula, $0.90 \leq a \leq 1.1$, $0 \leq b \leq 0.9$, $0 \leq c \leq 0.9$, and $0.001 \leq d \leq 0.2$.

$$Li_aNi_bCo_cMn_dGeO_2 \quad \text{[Chemical Formula 11]}$$

wherein, in the above formula, $0.90 \leq a \leq 1.1$, $0 \leq b \leq 0.9$, $0 \leq c \leq 0.5$, $0 \leq d \leq 0.5$, and $0.000 \leq e \leq 0.2$.

$$Li_aNiG_bO_2 \quad \text{[Chemical Formula 12]}$$

wherein, in the above formula, $0.90 \leq a \leq 1.1$ and $0.001 \leq b \leq 0.1$.

$$Li_aCoG_bO_2 \quad \text{[Chemical Formula 13]}$$

wherein, in the above formula, $0.90 \leq a \leq 1.1$ and $0.001 \leq b \leq 0.1$.

$$Li_aMnG_bO_2 \quad \text{[Chemical Formula 14]}$$

wherein, in the above formula, $0.90 \leq a \leq 1.1$ and $0.001 \leq b \leq 0.1$.

$$Li_aMn_2G_bO_4 \quad \text{[Chemical Formula 15]}$$

wherein, in the above formula, $0.90 \leq a \leq 1.1$ and $0.001 \leq b \leq 0.1$.

$$QO_2. \quad \text{[Chemical Formula 16]}$$

$$QS_2. \quad \text{[Chemical Formula 17]}$$

$$LIQS_2. \quad \text{[Chemical Formula 18]}$$

$$V_2O_5. \quad \text{[Chemical Formula 19]}$$

$$LiV_2O_5. \quad \text{[Chemical Formula 20]}$$

$$LiIO_2. \quad \text{[Chemical Formula 21]}$$

$$LiNiVO_4. \quad \text{[Chemical Formula 22]}$$

$$Li_{3-f}J_2(PO_4)_3 \; (0 \leq f \leq 3). \quad \text{[Chemical Formula 23]}$$

$$Li_{3-f}Fe_2(PO_4)_3 \; (0 \leq f \leq 3). \quad \text{[Chemical Formula 24]}$$

In the above Chemical Formulas 1 to 24, it is to be understood that A, B, C, D, E, F, G, Q, I, and J represent variables as further defined herein. In other words, in the above Chemical Formulas 1 to 24 only, B does not represent boron, C does not represent carbon, F does not represent fluorine and I does not represent iodine. A is selected from the group consisting of Ni, Co, Mn, and combinations thereof; B is selected from the group consisting of Al, Ni, Co, Mn, Cr, Fe, Mg, Sr, V, a rare earth element, and combinations thereof; D is selected from the group consisting of O, F (fluorine), S, P, and combinations thereof; E is selected from the group consisting of Co, Mn, and combinations thereof; F is selected from the group consisting of F (fluorine), S, P, and combinations thereof; G is selected from the group consisting of Al, Cr, Mn, Fe, Mg, La, Ce, Sr, V, a lanthanide element, and combinations thereof; Q is selected from the group consisting of Ti, Mo, Mn, and combinations thereof; I is selected from the group consisting of Cr, V, Fe, Sc, Y, and combinations thereof; and J is selected from the group consisting of V, Cr, Mn, Co, Ni, Cu, and combinations thereof.

In addition, the positive active material may include inorganic sulfur ($S_8$, elemental sulfur) and a sulfur-based compound. The sulfur-based compound may include $Li_2S_n$ ($n \geq 1$), $Li_2S_n$ ($n \geq 1$) dissolved in a catholyte, an organic sulfur compound, a carbon-sulfur polymer ($(C_2S_f)_n$: f=2.5 to 50, $n \geq 2$), or the like.

The positive active material may include the positive active material with the coating layer, or a compound of the active material and the active material coated with the coating layer. The coating layer may include at least one coating element compound selected from the group consisting of an oxide and a hydroxide of the coating element, an oxyhydroxide of the coating element, an oxycarbonate of the coating element, and a hydroxycarbonate of the coating element. The compound for the coating layer may be either amorphous or crystalline. The coating element included in the coating layer may be selected from the group consisting of Mg, Al, Co, K, Na, Ca, Si, Ti, V, Sn, Ge, Ga, B, As, Zr, and combinations thereof. The coating process may include any conventional process (e.g., spray coating, immersing) that is well known to persons having ordinary skill in this art and that does not adversely affect the properties of the positive active material, so a detailed description thereof is omitted.

The positive active material layer further includes a binder and a conductive agent.

The binder improves binding properties of the positive active material particles to each other and to a current collector. Examples of the binder include at least one selected from the group consisting of polyvinylalcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and so on, but is not limited thereto.

The conductive agent improves the electrical conductivity of the positive electrode. Any electrically conductive material that does not cause a chemical change in the positive active material. Examples of the conductive agent include natural graphite, artificial graphite, carbon black, acetylene black, ketjen black, a carbon fiber, a metal powder or a metal fiber including copper, nickel, aluminum, silver, and so on, or a polyphenylene derivative.

The current collector may be Al, but is not limited thereto.

The positive electrode may be fabricated as follows: a composition for a positive active material layer is prepared by mixing the positive active material, a binder, and a conductive agent, and then the composition for a positive active material layer is coated on a current collector such as aluminum.

The electrolyte includes a lithium salt dissolved in a non-aqueous organic solvent. The lithium salt supplies lithium ions in the battery and facilitates a basic operation of the rechargeable lithium battery and improves lithium ion transport between positive and negative electrodes.

Non-limiting examples of the lithium salt include at least one selected from the group consisting of $LiPF_6$, $LiBF_4$, $LiSbF_6$, $LiAsF_6$, $LiClO_4$, $LiCF_3SO_3$, $LiC_4F_9SO_3$, $LiN(CF_3SO_2)_2$, $LiN(C_2F_5SO_2)_2$, $LiAlO_2$, $LiAlCl_4$, $LiN(C_pF_{2p+1}SO_2)(C_qF_{2q+1}SO_2)$ (where p and q are natural numbers), LiCl, LiI, lithium bisoxalate borate, and combinations thereof.

The lithium salt may be used at a 0.1 to 2.0M concentration. As a specific, non-limiting example, the lithium salt may be used at a 0.7 to 1.6 M concentration. When the lithium salt concentration is less than 0.1M, electrolyte performance may be worsened due to low electrolyte conductivity. On the other hand, when the lithium salt concentration is more than 2.0M, lithium ion mobility may be reduced due to an increase of electrolyte viscosity.

The non-aqueous organic solvent acts as a medium for transmitting ions taking part in the electrochemical reaction of the battery. The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and so on. Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and so on. Examples of the ether-based solvent include dibutyl ether, tetraglyme, diglyme, dimethoxyethane, 2-methyltetrahydrofuran, tetrahydrofuran, and so on, and examples of the ketone-based solvent include cyclohexanone, and so on. Examples of the alcohol-based solvent include ethyl alcohol, isopropyl alcohol, and so on, and examples of the aprotic solvent include nitriles such as X—CN (wherein X is a C2 to C20 linear, branched, or cyclic hydrocarbon, a double bond, an aromatic ring, or an ether bond), amides such as dimethylformamide, dioxolanes such as 1,3-dioxolane, sulfolanes, and so on.

The non-aqueous organic solvent may be used singularly or in a mixture. When the organic solvent is used in a mixture, a mixture ratio can be controlled in accordance with a desirable battery performance.

The carbonate-based solvent may include a mixture of a cyclic carbonate and a linear carbonate. The cyclic carbonate and the chain carbonate are mixed together in the volume ratio of 1:1 to 1:9, and when the mixture is used as an electrolyte, the electrolyte performance may be enhanced.

In addition, the electrolyte of the present invention may further include mixtures of carbonate-based solvents and aromatic hydrocarbon-based solvents. The carbonate-based solvents and the aromatic hydrocarbon-based solvents are preferably mixed together in the volume ratio of 1:1 to 30:1.

The aromatic hydrocarbon-based organic solvent may be represented by the following Formula 25:

[Chemical Formula 25]

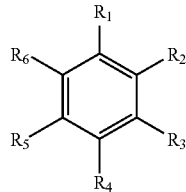

where $R_1$ to $R_6$ are independently selected from the group consisting of hydrogen, a halogen, a C1 to C10 alkyl, a C1 to C10 haloalkyl, and combinations thereof.

The aromatic hydrocarbon-based organic solvent may include, but is not limited to, at least one selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The non-aqueous electrolyte may further include vinylene carbonate or an ethylene carbonate-based compound of the following Formula 26:

[Chemical Formula 26]

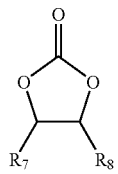

wherein $R_7$ and $R_8$ are independently selected from the group consisting of hydrogen, a halogen, a cyano (CN), a nitro ($NO_2$), and a C1 to C5 fluoroalkyl, and $R_7$ and $R_8$ are not simultaneously hydrogen.

The ethylene carbonate-based compound includes difluoroethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The use amount of the additive for improving cycle-life may be adjusted within an appropriate range.

The rechargeable lithium battery may further include a separator between the negative electrode 112 and the positive electrode 114, as needed. The separator 113 separates the negative electrode 112 and positive electrode 114 and provides a transporting path of lithium ions. Non-limiting examples of suitable separator 113 materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

The following examples illustrate aspects of the present invention in more detail. These examples, however, should not in any sense be interpreted as limiting the scope of the present invention.

EXAMPLE 1

A negative active material of Si, a sheet-shaped natural graphite (average particle diameter ($D_{50}$=5 μm), and a binder of polyvinylidene fluoride (PVDF) were mixed in a weight ratio of 72:18:10, and dispersed in N-methyl-2-pyrrolidone to provide a composition for a negative active material layer. The composition for the negative active material layer was coated onto a 10 μm thick copper foil and dried to provide a 40 μm thick negative electrode.

A positive active material of $LiCoO_2$ having an average particle diameter of 10 μm was mixed with a binder of PVDF and a conductive agent of carbon (SUPER-P (Timcal)) at a weight ratio of 94:3:3, and dispersed in N-methyl-2-pyrrolidone to provide a composition for a positive active material layer. The composition was coated onto 15 μm thick aluminum foil, dried, and pressed to provide a positive electrode.

The provided electrodes were wound with a 25 μm polyethylene material separator, compressed, and injected with an electrolyte solution to provide a 18650 cylindrical cell. The electrolyte was provided by dissolving $LiPF_6$ into a mixed solvent of propylene carbonate (PC), diethyl carbonate (DEC), and ethylene carbonate (EC) (volume ratio of PC:DEC:EC=1:1:1) to get a concentration of 1 mol/L.

EXAMPLE 2

A negative active material of Sn, sheet-shaped natural graphite (average particle diameter ($D_{50}$=5 μm), and a binder of PVDF were mixed at a weight ratio of 70:20:10, and dispersed in a N-methyl-2-pyrrolidone to provide a composition for a negative active material layer. The composition was coated onto a 10 μm thick copper foil and disposed between electromagnets, and a 2.3 T magnetic field was applied for 2 minutes. Subsequently, the composition-coated current collector was dried in a furnace at 60° C. for 30 minutes to volatilize the solvent and provide a 35 μm thick negative electrode. It was confirmed that the (002) plane of the sheet-shaped graphite particles was aligned in a vertical direction with respect to the current collector.

A rechargeable lithium battery cell was fabricated in accordance with the same procedure as in Example 1, expect that the provided negative electrode was used.

EXAMPLE 3

A negative active material of $SiO_x$ (0.5<x<1.5), a sheet-shaped natural graphite (average particle diameter ($D_{50}$=5 μm), and a binder of PVDF were mixed at a weight ratio of 70:20:10 and dispersed in N-methyl-2-pyrrolidone to provide a composition slurry for a negative active material layer. The slurry was coated onto a 10 μm thick copper foil and dried to provide a 40 μm thick negative electrode.

A rechargeable lithium battery cell was fabricated in accordance with the same procedure as in Example 2, except that the provided negative electrode was used.

EXAMPLE 4

A negative active material of $SnO_2$, a sheet-shaped artificial graphite (average particle diameter ($D_{50}$=1 μm), and a binder of PVDF were mixed at a weight ratio of 60:30:10 and dispersed in N-methyl-2-pyrrolidone to provide a composition slurry for a negative active material layer. The slurry was coated onto a 10 μm thick copper foil and dried to provide a 40 μm thick negative electrode.

A rechargeable lithium battery cell was fabricated in accordance with the same procedure as in Example 1, except that the provided negative electrode was used.

EXAMPLE 5

A negative active material of Si, a sheet-shaped natural graphite (average particle diameter ($D_{50}$=10 μm), and a binder of PVDF were mixed at a weight ratio of 70:20:10 and dispersed in N-methyl-2-pyrrolidone to provide a composition slurry for a negative active material layer. The slurry was coated onto a 10 μm thick copper foil and dried to provide a 40 μm thick negative electrode.

A rechargeable lithium battery was fabricated in accordance with the same procedure as in Example 1, except that the provided negative electrode was used.

COMPARATIVE EXAMPLE 1

A negative active material of Si and a binder of PVDF were mixed in a weight ratio of 92:8 and dispersed in N-methyl-2-pyrrolidone to provide a composition slurry for a negative active material layer. The slurry was coated onto a 10 μm thick copper foil, and dried to provide a 40 μm thick negative electrode.

The rechargeable lithium battery was fabricated in accordance with the same procedure as in Example 1, except that the provided negative electrode was used.

COMPARATIVE EXAMPLE 2

A negative active material of Si, a particle-shaped crystalline artificial graphite (average particle diameter ($D_{50}$=25 μm), and a binder of PVDF were mixed in a weight ratio of 70:20:10 and dispersed in N-methyl-2-pyrrolidone to provide a composition slurry for a negative active material layer. The slurry was coated onto a 10 μm thick copper foil and dried to provide a 40 μm thick negative electrode.

COMPARATIVE EXAMPLE 3

A rechargeable lithium battery cell was fabricated in accordance with the same procedure as in Example 1, except that particle-shaped natural graphite was used instead of the sheet-shaped natural graphite.

The rechargeable lithium battery cell was fabricated in accordance with the same procedure as in Example 1, except that the provided negative electrode was used.

The battery cells according to Example 1 and Comparative Example 1 were measured to analyze the porosity in accordance with the pore size in the negative electrode. The results are shown in FIG. 3A and FIG. 3B.

Figure 3A:
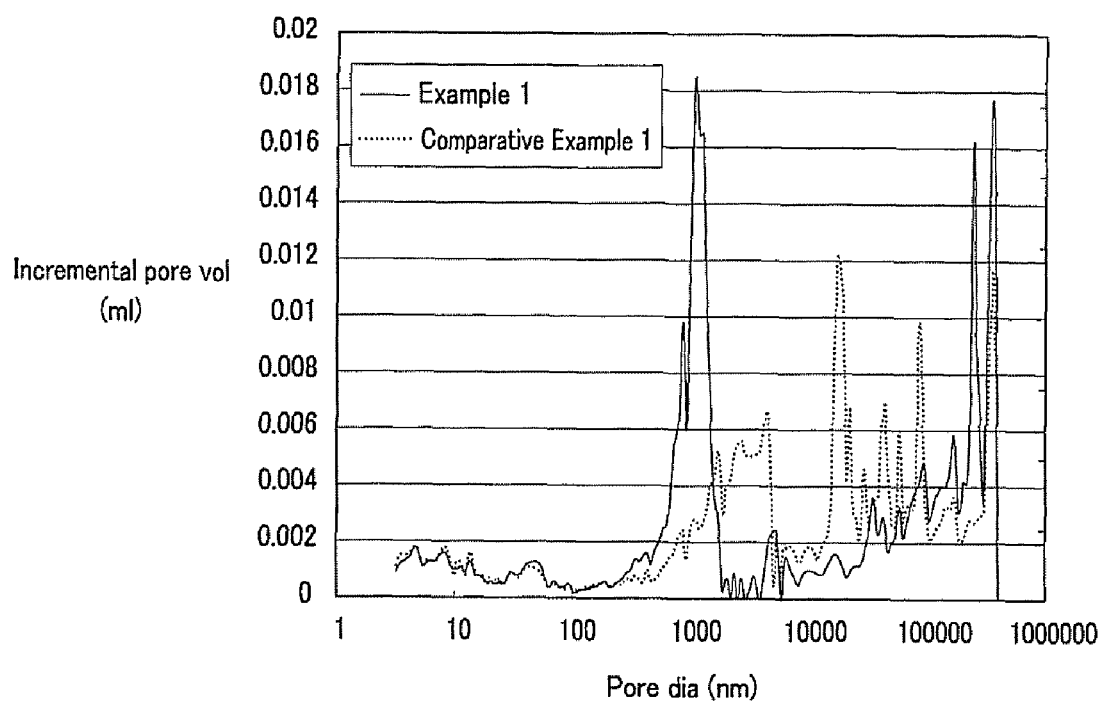
FIG. 3A is a graph showing a measurement result of an incremental pore volume in accordance with a pore diameter of the battery cells according to Example 1 and Comparative Example 1.

FIG. 3A is a graph showing a measurement result of an incremental pore volume in accordance with a pore diameter of the battery cells according to Example 1 and Comparative Example 1. FIG. 3B is a graph showing a measurement result of an accumulated pore volume in accordance with a pore diameter of the battery cells according to Example 1 and Comparative Example 1.

Figure 3B:
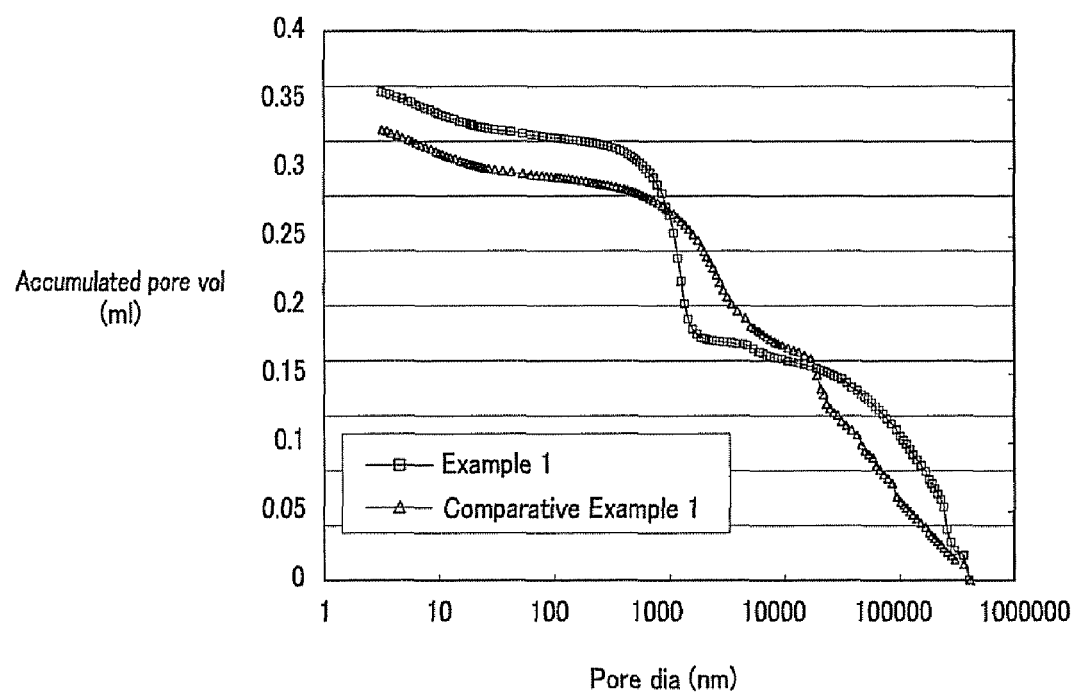
FIG. 3B is a graph showing a measurement result of an accumulated pore volume in accordance with a pore diameter of the battery cells according to Example 1 and Comparative Example 1.

As shown in FIGS. 3A and 3B, the battery cell according to Example 1, which included sheet-shaped graphite, had a higher porosity of the negative electrode than that according to Comparative Example 1, which did not include sheet-shaped graphite.

In addition, porosity in which the pore diameter was 1 μm or less was 40 volume % or more in the negative electrode according to Example 1, and porosity in which the pore diameter was 1 μm or less was 25 volume % or less according to Comparative Example 1. From the results, it is anticipated that the battery cell obtained from Example 1 can more effectively control both the volume expansion of the negative active material particles and electrolyte solution drying during charging.

The battery cells according to Examples 1 to 5 and Comparative Examples 1 to 3 were measured for porosity in the negative active material layer using a mercury porosimeter. The results are shown in the following Table 1.

TABLE 1

|  | Porosity (%) |
| --- | --- |
| Example 1 | 45 |
| Example 2 | 50 |
| Example 3 | 40 |
| Example 4 | 35 |
| Example 5 | 60 |
| Comparative Example 1 | 15 |
| Comparative Example 2 | 45 |
| Comparative Example 3 | 30 |

As shown in Table 1, the negative active material layers including the sheet-shaped graphite according to Examples 1 to 5 had higher porosity than that according to Comparative Example 1 not including the graphite. The negative active material layers according to Comparative Examples 2 and 3 had comparatively high porosities since the negative active material layers included particle-shaped graphite instead of sheet-shaped graphite.

The battery cells according to Example 1 and Comparative Example 1 were measured for the electrode thickness variance. The electrode thickness variance measurement was carried out under the condition of 0.1 C⇌0.1 C (one-time charge and discharge) at between 2.75 and 4.2 V.

Figure 4:
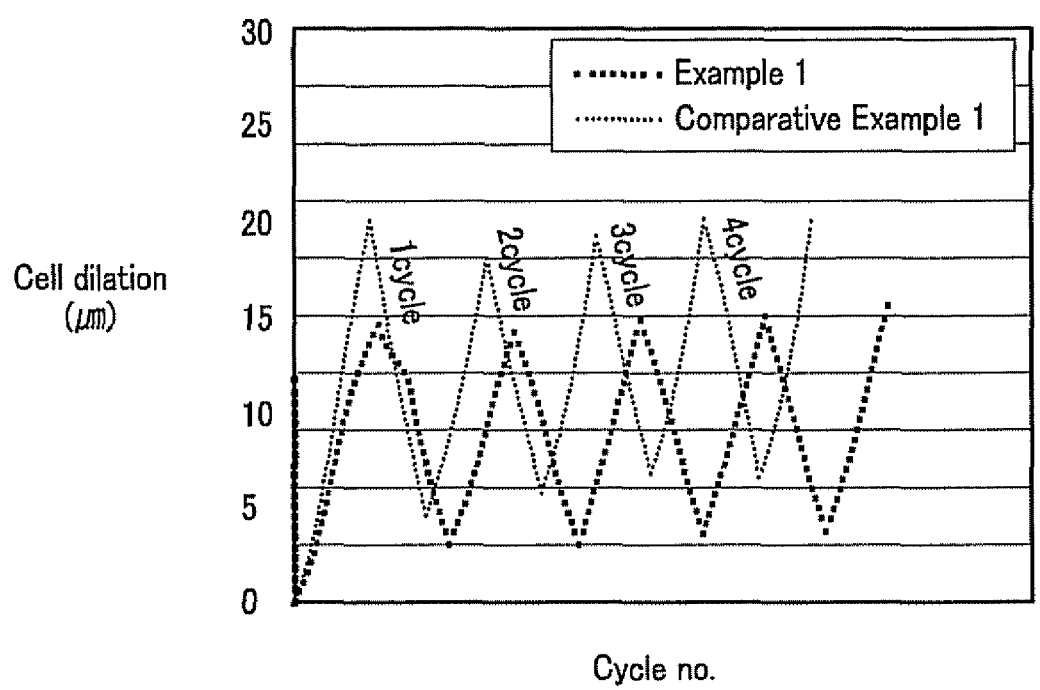
FIG. 4 is a graph showing a measurement result of thickness variance in accordance with capacity of the battery cells according to Example 1 and Comparative Example 1.

FIG. 4 is a graph showing a measurement result of thickness variance in accordance with capacity of the battery cells according to Example 1 and Comparative Example 1. As shown in FIG. 4, the cell including sheet-shaped graphite according to Example 1 remarkably decreased the electrode expansion rate compared to the cell according to of Comparative Example 1. Therefore, the battery characteristics of the cell according to Example 1 were improved compared to that of Comparative Example 1.

In accordance with the same procedure, the rechargeable lithium battery cells according to Examples 1 to 5 and Comparative Examples 1 to 3 were measured and compared regarding electrode thickness expansion rate. The results are shown in Table 2.

TABLE 2

|  | Thickness expansion rate (%) |
| --- | --- |
| Example 1 | 40 |
| Example 2 | 35 |
| Example 3 | 20 |
| Example 4 | 25 |
| Example 5 | 55 |
| Comparative Example 1 | 250 |
| Comparative Example 2 | 150 |
| Comparative Example 3 | 100 |

As shown in Table 2, the cells according to Examples 1 to 5 where the negative active material layers have high porosities and include sheet-shaped graphite showed a thickness expansion rate of 55% or less. By contrast, the cell according to Comparative Example 1, in which the negative active material layer has a low porosity and does not include sheet-shaped graphite showed a thickness expansion rate of 250%. The cells according to Comparative Examples 2 and 3, in which the negative active material layers have high porosities and include particle-shaped graphite instead of sheet-shaped graphite, showed thickness expansion rates of 150% and 100%, respectively. The reason why the electrode thickness expansion rate of the rechargeable lithium battery cell according to Comparative Example 3 was remarkably high even though its negative active material had a similar level of porosity to that of Example 1 is that the sheet-shaped graphite included in the cell according to Example 1 functioned as a solid lubricant, and the particle-shaped graphite included in the cell according to Comparative Example 2 could not function as the solid lubricant. Therefore, the cell according to Comparative Example 2 insufficiently utilizes pores during electrode expansion.

From the results, it is understood that the sheet-shaped graphite according to aspects of the present invention have much better electrode expansion suppressing effects.

The cell according to Comparative Example 2 also showed a high thickness expansion rate similar to that of Comparative Example 3, indicating that the particle-shaped graphite could not function as the solid lubricant.

The negative electrode for a rechargeable lithium battery can improve cell characteristics by inhibiting volume change and stress due to active material particle bombardment during charge and discharge and by decreasing electrode resistance.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A negative electrode for a rechargeable lithium battery, comprising:
   a current collector; and
   a negative active material layer disposed on the current collector,
   wherein the negative active material layer comprises a metal-based negative active material and sheet-shaped graphite and has a porosity of 20 to 80 volume %;
   wherein pores of the negative active material layer having a pore diameter of from 0.5 µm to 1 µM constitute 30 to 70 volume % based on the total pore-volume.

2. The negative electrode of claim 1, wherein the sheet-shaped graphite is present in an amount of 5 to 80 wt % based on the total weight of the negative active material layer.

3. The negative electrode of claim 1, wherein (002) planes of the sheet-shaped graphite are oriented in the same direction.

4. The negative electrode of claim 1, wherein (002) planes of the sheet-shaped graphite are oriented in a vertical direction with respect to the current collector.

5. The negative electrode of claim 1, wherein the sheet-shaped graphite is at least one selected from the group consisting of natural graphite, artificial graphite, pyrolyzed graphite, and mixtures thereof.

6. The negative electrode of claim 1, wherein the sheet-shaped graphite has an average particle diameter ($D_{50}$) ranging from 1 to 20 µm.

7. The negative electrode of claim 1, wherein the metal-based negative active material is at least one selected from the group consisting of lithium, a metal material that alloys with lithium, a material that is reversibly doped and dedoped with lithium, a material that reversibly forms a lithium-containing compound, a transition element oxide, and mixtures thereof.

8. The negative electrode of claim 1, wherein the metal-based negative active material is at least one selected from the group consisting of Na, K, Rb, Cs, Fr, Be, Mg, Ca, Sr, Ba, Ra, Ti, Ag, Zn, Cd, Al, Ga, In, Si, Ge, Sn, Pb, Sb, Bi, and combinations thereof.

9. The negative electrode of claim 1, wherein the metal-based negative active material is vanadium oxide; lithium vanadium oxide; Si; $SiO_x$ ($0 \leq x \leq 2$); Sn; $SnO_2$; an alloy of transition element and an element selected from the group consisting of Si, Sn, Al, and combinations thereof; or mixtures thereof.

10. A rechargeable lithium battery comprising:
    a negative electrode;
    a positive electrode comprising a positive active material that reversibly intercalates and deintercalates lithium ions; and
    an electrolyte comprising a non-aqueous organic solvent and a lithium salt,
    wherein the negative electrode comprises a current collector and a negative active material layer disposed on the current collector, and
    the negative active material layer comprises a metal-based negative active material and sheet-shaped graphite and has a porosity of 20 to 80 volume %;
    wherein pores of the negative active material layer having a pore diameter of from 0.5 µm to 1 µm constitute 30 to 70 volume % based on the total pore volume.

11. The rechargeable lithium battery of claim 10, wherein the sheet-shaped graphite is present in an amount of 5 to 80 wt% based on the total weight of the negative active material layer.

12. The rechargeable lithium battery of claim 10, wherein (002) planes of the sheet-shaped graphite are oriented in the same direction.

13. The rechargeable lithium battery of claim 10, wherein (002) planes of the sheet-shaped graphite are oriented in a vertical direction with respect to the current collector.

14. The rechargeable lithium battery of claim 10, wherein the sheet-shaped graphite is at least one selected from the group consisting of natural graphite, artificial graphite, pyrolyzed graphite, and mixtures thereof.

15. The rechargeable lithium battery of claim 10, wherein the sheet-shaped graphite has an average particle diameter ($D_{50}$) ranging from 1 to 20 μm.

16. The rechargeable lithium battery of claim 10, wherein the metal-based negative active material is at least one selected from the group consisting of lithium, a metal material that alloys with lithium, a material that is reversibly doped and dedoped with lithium, a material that reversibly forms a lithium-containing compound, a transition element oxide, and mixtures thereof.

17. The rechargeable lithium battery of claim 10, wherein the metal-based negative active material is at least one selected from the group consisting of Na, K, Rb, Cs, Fr, Be, Mg, Ca, Sr, Ba, Ra, Ti, Ag, Zn, Cd, Al, Ga, In, Si, Ge, Sn, Pb, Sb, Bi, and combinations thereof.

18. The rechargeable lithium battery of claim 10, wherein the metal-based negative active material is vanadium oxide; lithium vanadium oxide; Si; $SiO_x$ ($0 \leq x \leq 2$); Sn; $SnO_2$; an alloy of transition element and an element selected from the group consisting of Si, Sn, Al, and combinations thereof; or mixtures thereof.

\* \* \* \* \*

UNITED STATES PATENT AND TRADEMARK OFFICE
CERTIFICATE OF CORRECTION

PATENT NO. : 8,349,492 B2  
APPLICATION NO. : 12/017451  
DATED : January 8, 2013  
INVENTOR(S) : Lee et al.

It is certified that error appears in the above-identified patent and that said Letters Patent is hereby corrected as shown below:

In the Specifications:

In column 4 at line 45, change "polyvinyidifluoride," to --polyvinyldifluoride,--.

In column 5 at line 39, change "shaped shaped" to --shaped--.

In column 6 at line 66 (approx.), change "$0.000 \leq e \leq 0.2$." to --$0.001 \leq e \leq 0.2$.--.

In column 7 at line 19 (approx.), change "Change "LlQS$_2$." to --LiQS$_2$.--.

In column 7 at line 29 (approx.), change "($0 \leq f \leq 3$)." to --($0 \leq f \leq 2$).--.

In the Claims:

In column 14 at line 16 in Claim 1, change "1 µM" to --1 µm--.

In column 14 at line 48, in Claim 9, change "($0 \leq x \leq 2$);" to --($0 < x < 2$);--.

In column 16 at line 13, in Claim 18, change "($0 \leq x \leq 2$);" to --($0 < x < 2$);--.

Signed and Sealed this  
Sixth Day of August, 2013

Teresa Stanek Rea  
*Acting Director of the United States Patent and Trademark Office*